(12) United States Patent
Vaughan et al.

(10) Patent No.: US 8,131,731 B2
(45) Date of Patent: Mar. 6, 2012

(54) RELEVANCY SORTING OF USER'S BROWSER HISTORY

(75) Inventors: Christopher M. Vaughan, Seattle, WA (US); Oliver Wallace, Redmond, WA (US); Carlos Yeung, Seattle, WA (US); Amit Gupta, Sammamish, WA (US); Christophe Marle, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 11/964,952

(22) Filed: Dec. 27, 2007

(65) Prior Publication Data

US 2009/0171930 A1 Jul. 2, 2009

(51) Int. Cl.
*G06F 17/30* (2006.01)
(52) U.S. Cl. .......................... 707/748; 707/767
(58) Field of Classification Search .................. 707/722, 707/767, 748
See application file for complete search history.

(56) References Cited

U.S. PATENT DOCUMENTS

| | | | |
|---|---|---|---|
| 6,460,060 B1 | 10/2002 | Maddalozzo et al. | |
| 6,631,496 B1 * | 10/2003 | Li et al. | 715/200 |
| 6,667,751 B1 | 12/2003 | Wynn et al. | |
| 7,110,790 B2 * | 9/2006 | Nielsen et al. | 455/556.2 |
| 7,167,901 B1 | 1/2007 | Beadle et al. | |
| 7,305,385 B1 * | 12/2007 | Dzikiewicz et al. | 707/745 |
| 7,698,326 B2 * | 4/2010 | Thorn | 707/705 |
| 2002/0099694 A1 | 7/2002 | Diamond et al. | |
| 2002/0152258 A1 | 10/2002 | Zhou | |
| 2002/0191015 A1 | 12/2002 | Brown et al. | |
| 2005/0132018 A1 | 6/2005 | Milic-Frayling et al. | |
| 2005/0234940 A1 | 10/2005 | Apparao et al. | |
| 2005/0278317 A1 | 12/2005 | Gross et al. | |
| 2006/0064411 A1 | 3/2006 | Gross et al. | |
| 2006/0106769 A1 | 5/2006 | Gibbs | |
| 2006/0195442 A1 * | 8/2006 | Cone et al. | 707/5 |
| 2006/0206460 A1 | 9/2006 | Gadkari | |
| 2006/0242178 A1 * | 10/2006 | Butterfield et al. | 707/100 |
| 2006/0271558 A1 * | 11/2006 | Makela et al. | 707/10 |
| 2007/0011168 A1 | 1/2007 | Keohane et al. | |
| 2007/0162298 A1 | 7/2007 | Melton et al. | |
| 2007/0255754 A1 * | 11/2007 | Gheel | 707/104.1 |
| 2009/0132529 A1 * | 5/2009 | Gibbs | 707/5 |

FOREIGN PATENT DOCUMENTS

WO    WO-2007079388    7/2007

OTHER PUBLICATIONS

HTML 4.01 Specification, W3C Recommendation, Dec. 24, 1999, pp. 1-18.*
Firefox Autocomplete Manager Versions 1.0 through 2.2, Dec. 6, 2007, pp. 1-5.*
Pash, Lifehacker, Super Charge Your Address Bar with Autocomplete Manager, Oct. 23, 2007, p. 1.*

(Continued)

*Primary Examiner* — John E Breene
*Assistant Examiner* — Albert Phillips, III (57) ABSTRACT

Various embodiments provide a Web browser that employs a relevancy algorithm to make an educated guess as to the likelihood of a user's intended destination when the user begins to enter text into a browser's address bar. In one or more embodiments, the relevancy algorithm employs various parameters and assigns weights to the parameters to arrive at a collection of suggestions to provide to the user. By using various rules, associated weightings, and the relevancy algorithm, relevant suggestions can be provided to a user to facilitate their navigation activities.

20 Claims, 7 Drawing Sheets

OTHER PUBLICATIONS

Bug 78270, Order autocomplete completion candidates by time, Mar. 5, 2006. pp. 1-34.*
Internet Explorer 6: Save Time with Autocomplete, 2003, pp. 1-3.*
How-to Geek, Enable Partial Match AutoComplete in the Firefox Address bar, Dec. 3, 2007, pp. 1-4.*
Live Bookmarks in Firefox 1.5, Oct. 5, 2005, pp. 1-2.*
Cabello, Firefox 3 location bar just became almighty, Nov. 30, 2007, pp.*
"PCT Search Report and Written Opinion", Application No. PCT/US2008/086599, (Jun. 29, 2009),13 pages.
"Extended European Search Report", EP Application No. 08868513.6, (Dec. 3, 2010),9 pages.
"Firefox_/_Mozilla", pp. 1-3, 2006.
Grcar, et al., "User Profiling for Interest-focused Browsing History" ,SIKDD 2005 at multiconference IS 2005, Oct. 17, 2005, pp. 99-109.
Kilcoyne, "Search Engine Ranking" , Adaptavist.com Limited. , 2007, pp. 1-4.

* cited by examiner

RELEVANCY SORTING OF USER'S BROWSER HISTORY

BACKGROUND

Figure 1:
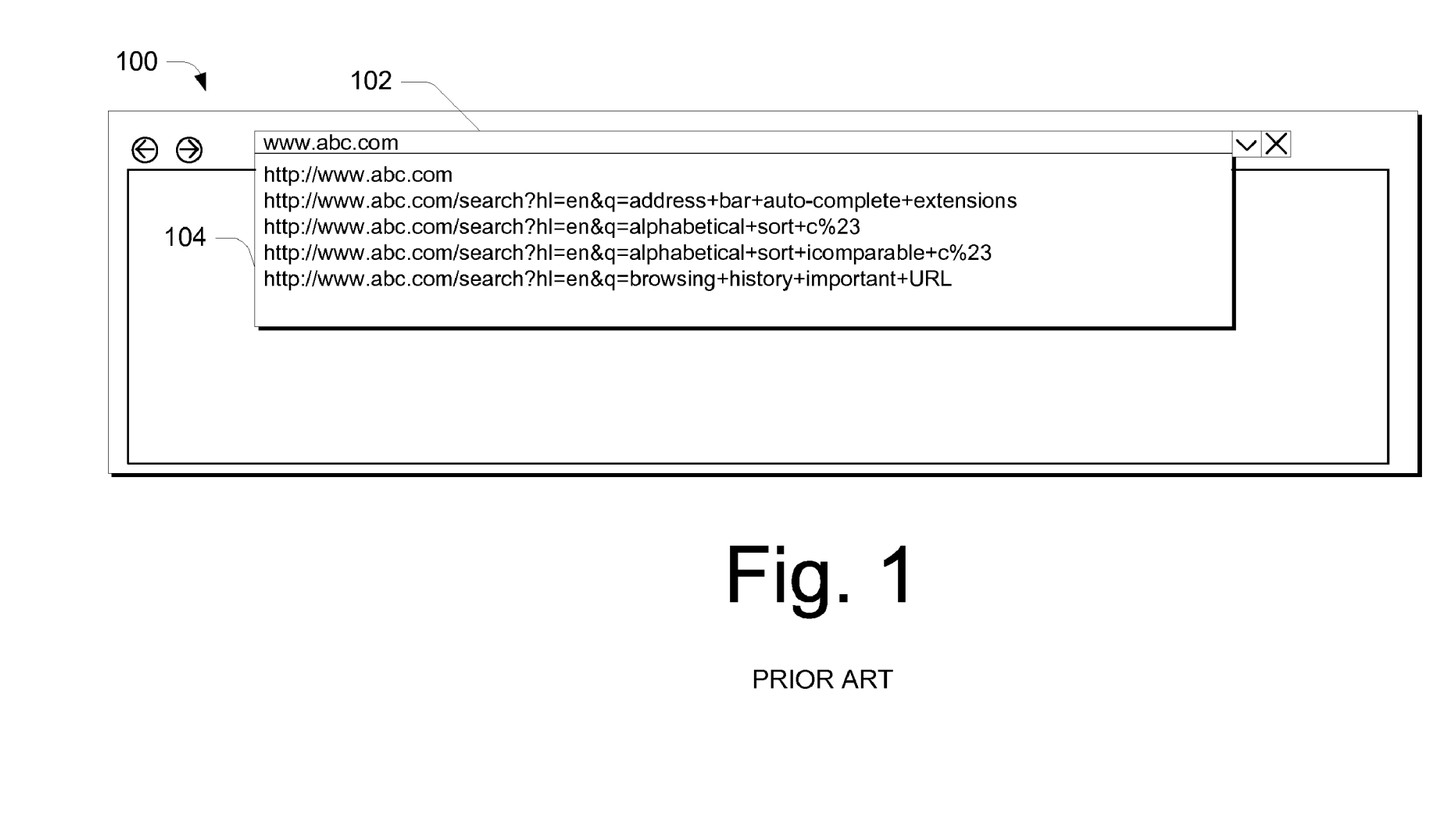
FIG. 1 illustrates a portion of a Web browser user interface.

Many Web browsers have an auto-complete feature that helps to provide a user with suggestions when the user types a text string into the browser's address bar. For example, if a user is searching for a particular website, they may type "www.abc.com" into the address bar of the browser. If the browser has an auto-complete feature, the user will often be provided with multiple suggestions that are found by performing URL prefix string matching on URLs that the user has typed along with those that are contained in the user's browsing history. For example, FIG. 1 illustrates a portion of a browser user interface generally at 100. User interface 100 includes an address bar 102 along with a drop-down menu 104 that provides auto-complete suggestions that match text that a user has entered in address bar 102.

Unfortunately, it can take multiple user actions, such as mouse clicks, key presses and the like, to search through the suggestions, and at times can leave the user without a relevant destination. This results in diminished productivity, browsing efficiency and an overall frustrating browsing experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a Web browser that employs a relevancy algorithm to make an educated guess as to the likelihood of a user's intended destination when the user begins to enter text into a browser's address bar. In one or more embodiments, the relevancy algorithm employs various parameters and assigns weights to the parameters to arrive at a collection of suggestions to provide to the user. By using various rules, associated weightings, and the relevancy algorithm, relevant suggestions can be provided to a user to facilitate their navigation activities.

BRIEF DESCRIPTION OF THE DRAWINGS

The same numbers are used throughout the drawings to reference like features.

DETAILED DESCRIPTION

Overview

Various embodiments provide a Web browser that employs a relevancy algorithm to make an educated guess as to the likelihood of a user's intended destination when the user begins to enter text into a browser's address bar. In one or more embodiments, the relevancy algorithm employs various parameters and assigns weights to the parameters to arrive at a collection of suggestions to provide to the user. By using various rules, associated weightings, and the relevancy algorithm, relevant suggestions can be provided to a user to facilitate their navigation activities. As used herein, a "destination" will be understood to include, by way of example and not limitation, a destination that a user is looking to visit. Destinations can include websites, RSS feeds and the like.

In the discussion that follows, a section entitled "Operating Environment" is provided and describes one environment in which one or more embodiments can be employed. Following this, a section entitled "Relevancy Overview" and associated sub-sections provide an overview of relevancy as that notion pertains to the described embodiments. Next, a section entitled "Implementation Example" and associated sub-sections provide one example of an implementation that can be employed in accordance with one or more embodiments. Last, a section entitled "Example System" is provided and describes an example system that can be used to implement various embodiments described herein.

Operating Environment

Figure 2:
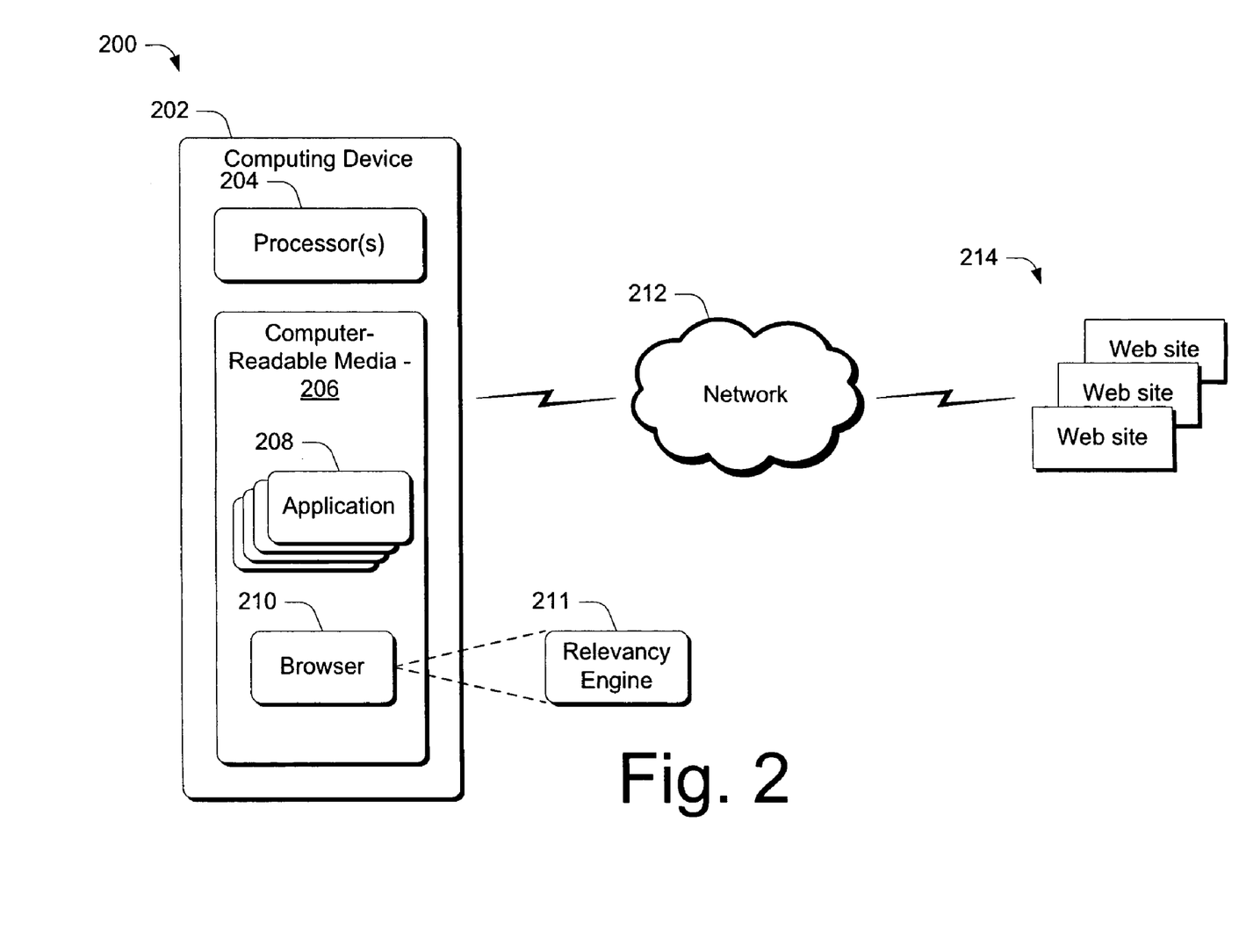
FIG. 2 illustrates an operating environment in which various principles described herein can be employed in accordance with one or more embodiments.

FIG. 2 illustrates an operating environment in accordance with one or more embodiments, generally at 200. Environment 200 includes a computing device 202 having one or more processors 204, one or more computer-readable media 206 and one or more applications 208 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 8.

In addition, computing device 202 includes a software application in the form of a Web browser 210. Any suitable Web browser can be used examples of which are available from the assignee of this document and others. In at least some embodiments, Web browser 210 is configured to employ a relevancy algorithm to make an educated guess as to the likelihood of a user's intended destination when the user begins to enter text into a browser's address bar. In one or more embodiments, the relevancy algorithm employs various parameters and assigns weights to the parameters to arrive at a collection of suggestions to provide to the user. By using various rules, associated weightings, and the relevancy algorithm, relevant suggestions can be provided to a user to facilitate their navigation activities. To this end, the Web browser includes, or otherwise has access to, a relevancy engine 211 that employs a relevancy algorithm(s) as described above and below. In at least some embodiments, the relevancy algorithm can combine elements such as string matches on URLs, titles, and content, as well as a combination of frequency of visits, time since the last visit, and whether the user has interacted with the site before to produce a set of suggestions for the user.

In addition, environment 200 includes a network 212, such as the Internet, and one or more Web sites 214 from and to which content can be received and sent.

Computing device 202 can be embodied as any suitable computing device such as, by way of example and not limitation, a desktop computer, a portable computer, a handheld computer such as a personal digital assistant (PDA), cell phone, and the like.

Relevancy Overview

In various embodiments, relevancy of particular items that can be accessed by a Web browser can be computed based upon parameters, also termed "metadata" throughout, associated with those items and weights that can be assigned to those parameters. A relevancy algorithm is used to process weighted parameters associated with the items, and then produce a collection of suggestions to be presented to a user.

In one or more embodiments, the collection of suggestions can be presented to a user responsive to a user performing some type of action that indicates that they would like to navigate to a destination. For example, in at least some embodiments, as a user enters a text string into an address bar that forms part of the Web browser, the collection of suggestions can be presented to the user. These suggestions can change dynamically as the user enters more and more text. Alternately or additionally, a collection of suggestions can be presented to the user when the user performs some other type of action such as clicking a user interface element to access an address bar drop-down menu. Hence, in some embodiments collected suggestions are presented to a user based upon the user actually entering text information. Yet, in other embodiments, collected suggestions are presented to the user independent of whether the user has actually entered text information.

In one or more embodiments, various parameters can be employed and can be associated with items to which a user may browse. The parameters can be weighted and can be processed by a relevancy algorithm to provide the user with a collection of suggestions. Such parameters can include, by way of example and not limitation, a title or custom title associated with an item, an URL associated with an item, the last date a particular item was visited, the frequency with which an item has been visited, and whether or not the user selected the item from a list. Each of these discussed in more detail just below.

Title or Custom Title

In some instances, if the text that a user enters matches with the title of an item, such as the title of a particular webpage to which the user has browsed in the past, this item can be weighted more heavily than those items whose titles do not match the user's entered text. Likewise, if a user has assigned a custom title to a particular item, such as in a user's favorites items, this item can be weighted more heavily than those items that do not have custom titles.

URL

In one or more embodiments, if the text that a user enters matches with some portion of an URL associated with an item to which the user has browsed in the past, this item can be weighted more heavily than those items having URLs that do not match a user's entered text. Further, in at least some embodiments, weights can be assigned depending on what portion of a URL matches with a user's entered text. For example, an URL whose domain matches the user's text can be weighted more heavily than an URL whose path matches the user's text. Thus, depending on what portion of an URL matches with a user's text, weights can be assigned accordingly. An example of how this can be done is provided below in the section entitled "Implementation Example".

Last Date Item was Visited

In one or more embodiments, items that have been more recently visited can be weighted more heavily than those items that have not been more recently visited. Here, an assumption is made that if a user recently visited a site and begins to type in text that matches with some portion of that site, it is likely that the recently-visited site is of some importance to the user.

Frequency Item has been Visited

In one or more embodiments, items that have been frequently visited can be weighted more heavily than those items that have not been frequently visited. Here, an assumption is made that if a user regularly visits a particular site and begins to type in text that matches some portion of that site, it is likely that the frequently-visited site is of some importance to the user.

Selected from a List

In one or more embodiments, if a particular item was selected from a list, it can be weighted more heavily than those items that have not been selected from a particular list. For example, one list from which items can be selected is a list that appears as part of an address bar drop-down menu. In the past, a user may have selected a particular item that was presented as a suggestion in their address bar drop-down menu. If this is the case, then the item can have its associated weight increased because of the apparent importance to the user. Now, the next time a user enters text that matches at least a portion of that item, the item may appear higher up in the collection of suggestions that is presented to the user.

Yet other parameters can be maintained and utilized in relevancy computations. Such other parameters can include, by way of example and not limitation, the date an item was last modified, an unread count, whether the user typed an entire string, how a user interacted with a page, tags or key words, and/or whether the term was used in a full text search. Each of these parameters is explored in more detail below.

Date an Item was Last Modified

In one or more embodiments, the date that the particular item was last modified can be used in assigning a weight to that item. This can be particularly useful in the context of RSS feeds. Here, an assumption is made that if a user recently updated an RSS feed, then the RSS feed may be more relevant to user than those feeds that have not been more recently updated. Accordingly, if a user's entered text matches, in some way, with an RSS feed that has been recently updated, it may appear higher in a collection of suggestions provided to the user.

Unread Count

In one or more embodiments, a so-called unread count can be used by the relevancy algorithm. For example, in at least some embodiments, RSS feeds with unread items may be ranked above or below RSS feeds without unread items.

Whether the User Typed an Entire String

In one or more embodiments, whether a user typed an entire string can be used to assign weights to a particular item. Specifically, an assumption is made that if a user typed an entire text string in to perform a search, then this item is likely more important and relevant to the user than other terms that did not constitute an entire text string. For example, one can assume that if the user typed an entire text string, then the user was, in some way, very specifically interested in the item associated with the text string. This being the case, the particular text string can be assigned a higher weight than other text strings that the user did not type in, in their entireties.

How a User Interacted with a Page

In one or more embodiments, the manner in which a user interacted with a particular page can be taken into account when assigning weights to a particular item. A user can interact with a page in many different ways. Based on the fact that a user has interacted with a particular page, one can assume that the user has or had some interest in that page. For example, a user may have typed in a particular password or credit card number into a particular page. If such is the case, the relevancy of this page can be raised by assigning an appropriate weight. Alternately or additionally, a user may have clicked on a particular link on a page, conducted some type of form filling operation on a page, printed a page, e-mailed a page, added the page to a favorite or taken some action to affect a domain grouping of a number of pages (e.g. looking for a product and reviews of a particular product across a number of pages). If such is the case, the relevancy of such pages can be raised by assigning appropriate weights to the pages.

Tags or Key Words

In one or more embodiments, a user may have assigned a tag or key word to a particular item. For example, a user may employ a search tag such as "goo" for "google". If such is the case, the relevancy of "google" can be raised by assigning an appropriate weight such that the next time the user types "goo", "google" is promoted.

In addition, if a user conducts a search using a particular search term, the landing pages that have been visited by a user can be tagged with the search term that presents that particular landing page. Based on this, if the user types the search term in again, the landing page's relevancy can be elevated by assigning an appropriate weight to it.

Whether the Term was Used in a Full Text Search

When a user conducts a search for a particular page using a particular term, pages that are returned to and visited by the user can be indexed. Thus, the content of the returned page or pages can be indexed and can be used to return items in subsequent searches. Specifically, if a user searches for the term "STIHL 3000" and visits four pages responsive to the search, the content of these four pages can be indexed such that if a user subsequently searches for the same term, these pages can be presented to the user in a collection of suggestions.

Figure 3:
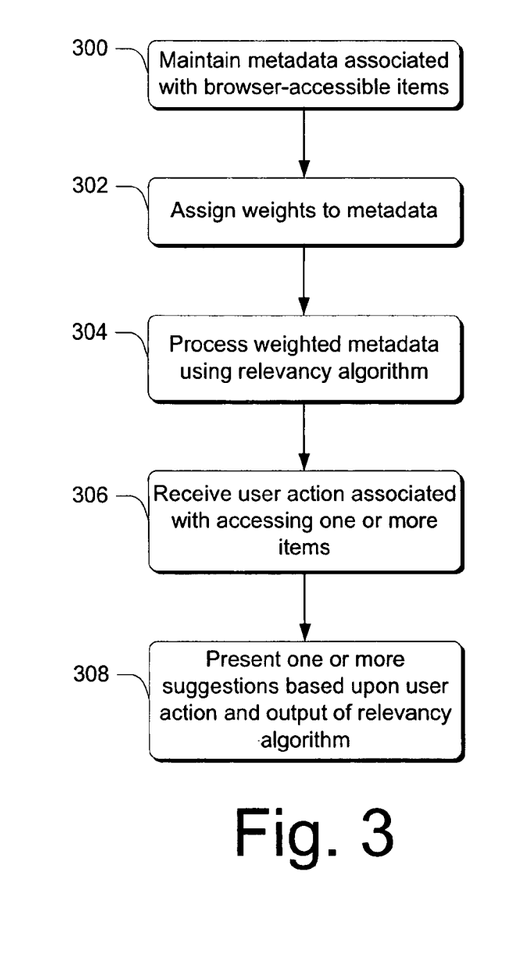
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser.

Step 300 maintains metadata associated with browser-accessible items. The metadata can be maintained in any suitable way. For example, the metadata can be maintained in a local metadata store that is maintained on a client device. Alternately or additionally, the metadata can be maintained in a remote metadata store. In addition, the metadata can be indexed in any suitable way. Step 302 assigns weights to the metadata. The weights can be assigned in any suitable way using any suitable assignments. Examples of properties that can be taken into account in assigning weights are described above and below in a section entitled "Implementation Example". Step 304 processes weighted metadata using a relevancy algorithm. Any suitable relevancy algorithm can be used, an example of which is provided below.

Step 306 receives a user action associated with accessing one or more items. Any suitable user action can be used. For example, in at least some embodiments a user action can include typing in applicable text in an address bar associated with a Web browser. Alternately or additionally, a user action can be one other than typing in applicable text. For example, in at least some embodiments, a user action can include accessing a drop-down menu, such as one that is provided in connection with a browser's address bar. Responsive to receiving the user action, step 308 presents one or more suggestions based upon the user action and an output of the relevancy algorithm.

In various embodiments, the suggestions that are presented to the user can include items that have been ranked in accordance with their relevancies as computed by the relevancy algorithm. Suggestions can be presented as a flat list of suggestions. Alternately or additionally, suggestions can be presented and grouped in accordance with various types that might be of interest to a user. For example, a user can use their Web browser to access items of various types. Examples of types include, by way of example and not limitation, history types, favorites types, feed types, and/or typed types.

History types include those items that appear in a user's browsing history. Favorites types include those items that appear in a user's list of favorites. Feed types include those feeds, such as RSS feeds, that a user can access. Such feeds may appear in a list of RSS feeds to which a user has subscribed or otherwise consumed. Typed types can include those items that a user has typed into an applicable user interface element such as an address bar and the like.

Consider now an implementation example that describes a specific implementation using the above-described principles, as well as other principles that more generally pertain to the implementation example.

Implementation Example

The discussion below provides but one implementation example that describes a mechanism that provides relevant data to a user, including a rule-set used to determine the relevancy of pieces of data, and a method for tuning the rule-set internally.

The term "relevancy", in the context of browsing the internet, is used to describe how pertinent, connected, or applicable some websites are to a given navigation query. When a user begins to enter some text into a browser, it is difficult to know the exact destination to which they are navigating. On the other hand, it is possible to make educated guesses as to the likelihood of their destination. This can be accomplished by applying values to metadata that is stored specific to a user's destination. The discussion below describes various rules and algorithms that can be applied to the aforementioned metadata, which thus makes up the described relevancy mechanism.

Providing a user with relevant suggestions or results can allow the user to navigate to their destinations with significantly less user actions, thus enabling them to be confident in finding their destination quickly. Also, a user's productivity can be increased by minimizing user actions and efficiencies can be enhanced when looking to revisit a website and provide the user with a more compelling browsing experience. As an example, consider the following scenarios that the inventive techniques can provide. Abby opens up her Web browser and clicks on the address bar and is returned the top 5 History, Favorites, and RSS Feeds ranked in terms of their relevancies as determined below. Abby then types in a website address that does not exist in her favorites. The next time she enters a query that matches that website it is more relevant and thus may appear higher on the list. Abby now decides to clear her browser's history. When she begins to type in a query after doing so, she realizes that relevant results for her favorites and RSS feeds are returned, but that no history results are returned. Abby then begins typing into the address bar. She notices that the more letters she types, the more relevant the results are. Abby now types a query into the address bar and sees a destination in the drop down list that she does not want to see again. She deletes it from the drop down list and it no longer appears for the same subsequent query—that is, its relevance has been demoted based upon an action she has taken. As will be appreciated, these and other scenarios can be provided using the inventive techniques described above and below.

In the illustrated and described embodiment, results or suggestions are returned and can be grouped in accordance with different types. As but an example of different types into which suggestions can be grouped, types can include typed URLs, history, favorites, and RSS feeds. Of course, other types can be used without departing from the spirit and scope of the claimed subject matter.

Figure 4:
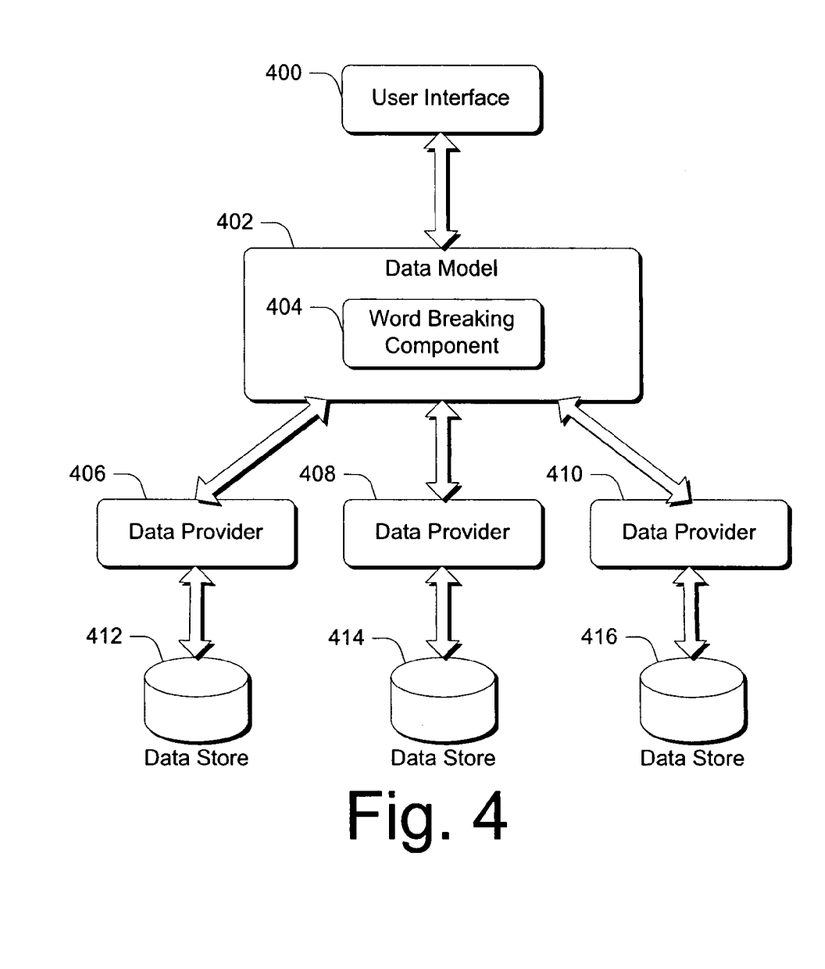
FIG. 4 illustrates an example system in accordance with one or more embodiments.

FIG. 4 illustrates an example system in accordance with one or more embodiments. In this example, the system includes a user interface 400, a data model 402 having a word breaking component 404, one or more data providers 406, 408, and 410, and one or more associated data stores 412, 414, and 416. In the illustrated and described embodiment, the user interface 400 is provided by a Web browser and includes, as part of the user interface, an address bar into which a user can type a query.

When the user enters a query via user interface 400, an associated query string is provided to the data model 402. The word breaking component 404 breaks the user's query into words and distributes the broken down query to one or more of the data providers 406, 408, and 410. The data providers then form queries that can be used to query various data stores that include indexed information such as items and various item metadata associated with a user's browsing activities. Examples of metadata are provided above and below. In one or more embodiments, the data providers utilize specific information associated with relevancy rule sets and/or algorithm(s) to formulate their queries.

The query or queries formulated by the data providers are then executed to filter out applicable results by matching the query words against string metadata and then sorting the results based on the relevancy of metadata weightings. Examples of metadata and metadata weightings are provided just below. After the results have been filtered and sorted, a result list is returned by the data provider for display to the user via the user interface 400. An example user interface is provided in FIG. 6 below.

Figure 5:
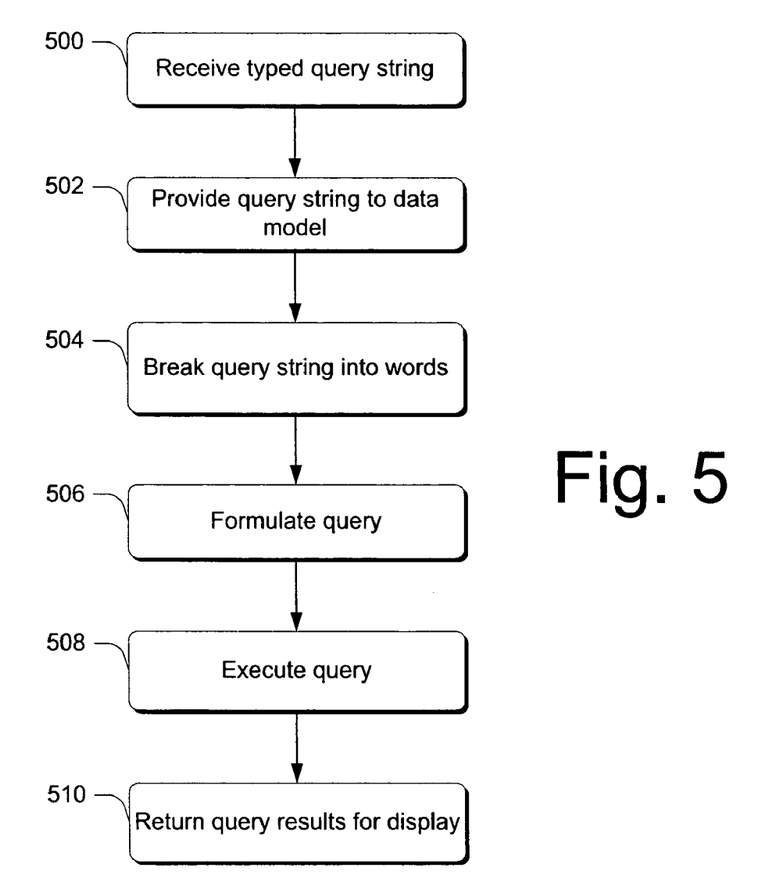
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser.

Step 500 receives a typed query string. This step can be performed when a user types in the query string to a suitable user interface element, such as an address bar that forms part of a Web browser. Step 502 provides the query string to a data model. Step 504 breaks the query string into words. Step 506 formulates a query using the broken down query string. Step 508 executes the query and step 510 returns query results for display for the user.

Figure 6:
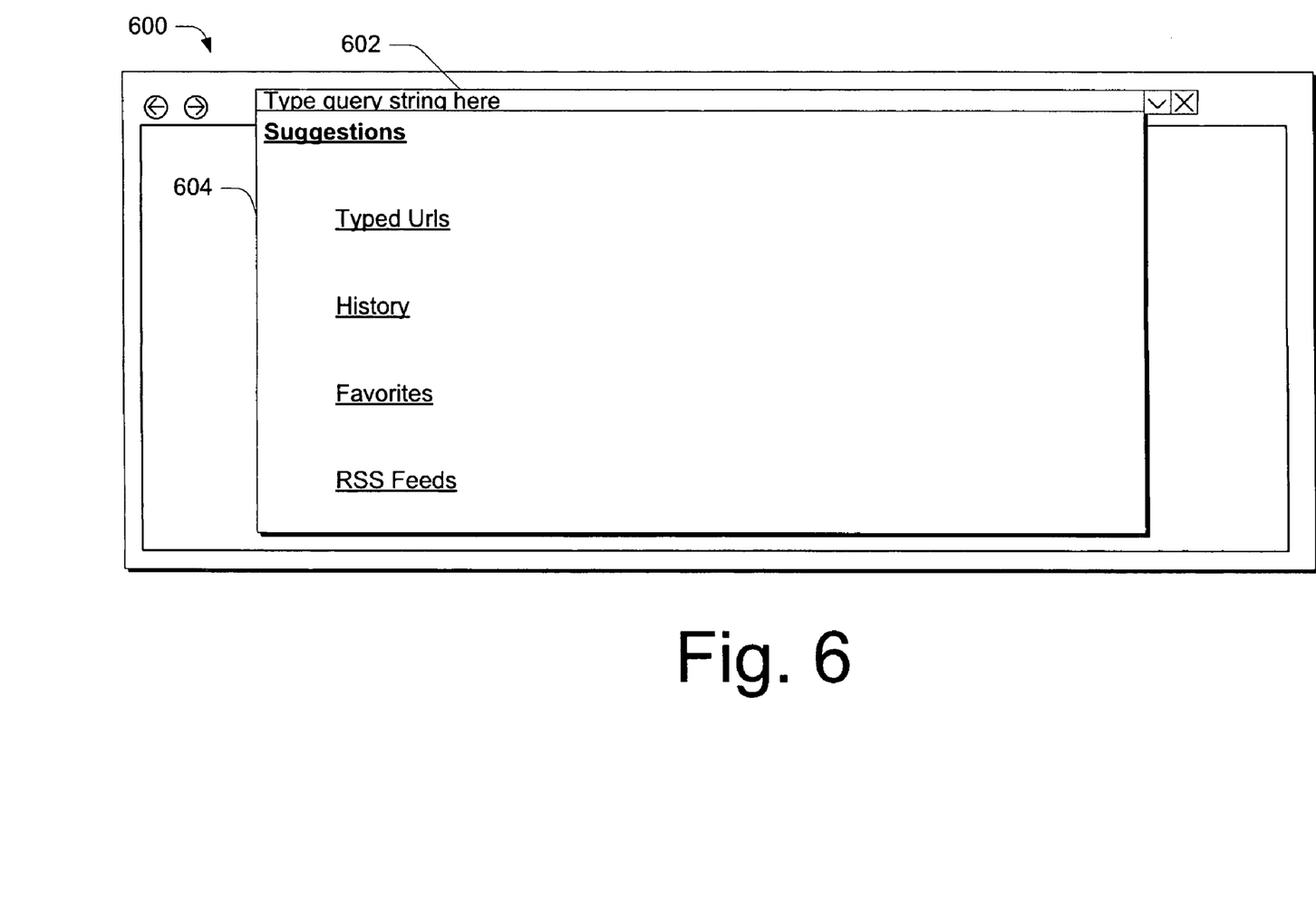
FIG. 6 illustrates a portion of a Web browser user interface in accordance with one or more embodiments.

FIG. 6 illustrates a portion of a browser user interface in accordance with one or more embodiments generally at 600. In this example, user interface 600 includes an address bar 602 into which a query string can be typed, and an associated drop down menu 604 that displays, for the user, various suggestions that are computed based on the relevancy algorithm described above and below. Notice in this example that the various suggestions can be grouped in accordance with different types. Specifically, in this particular example, the types include by way of example and not limitation, Typed URLs, History, Favorites, and RSS feeds. Other types can, of course, be used without departing from the spirit and scope of the claimed subject matter.

Having considered a general overview of a system, method, and user interface that can be used in accordance with one or more embodiments, consider now some example implementation details that can be utilized in accordance with the above-described embodiment. It is to be appreciated and understood that the implementation details described just below are intended as examples only. Accordingly, variations in the implementation details can be made without departing from the spirit and scope of the claimed subject matter.

Word Breaking Example

In one or more embodiments, both the user's query string and string metadata of a destination are broken up into words. In the above example, this is handled by word breaking component 404 in FIG. 4. In this example, words are delimited by converting forms of punctuation into spaces. Consider, for example, the following input URL and the resulting set of words:

---

Input
http://www.micro.soft.com/microsoft_software/search?hl=en&q=query+user+hello
Output
http www micro soft com microsoft software search hl en q query user hello

---

In this example, each string of characters that is separated by whitespace will be considered a word and then prefixed matched against the user query words. Note that sub-domains will also be word broken.

Destination Metadata

In the illustrated and described embodiment, destinations are indexed and those that are indexed include: History, Favorites, and RSS Feeds. Any suitable indexing scheme can be utilized. Typed URLs may or may not be indexed. If Typed URLs are not indexed, they will not be subject to word breaking and will be prefix matched against the user's query string.

Webpage Specific Metadata

In one or more embodiments, words entered by the user are broken and matched against separate pieces of URL metadata. The destination's URL will be broken up into different sections in order to designate their importance by applying weightings. Consider the following two URLs a user has previous visited.

http://www.host.com/path/and.htm?="query+query2"
http://website.internet.org/path1/longlongpath2/index.html?="search+query"

1.) URL with stripped protocol (underlined)
   a. This is saved in order to perform a prefix match between a one word user query and the URL.
2.) The hostname (bold underlined section),
   a. This is saved in order to perform word breaking on just the host
   b. The top level domain will not be saved for matching against user queries
3.) The remaining path and query string (un-bolded underlined section).
   a. This is saved in order to perform word breaking on just the path and query
4.) The Protocol itself
   a. A user can search for a specific site by entering the protocol: FTP or HTTP
      i. HTTP matches HTTPS but not the other way around.

The following tables outline the string metadata that are recorded for each destination.

History Specific Metadata

| Metadata | Description |
| --- | --- |
| Protocol | HTTP vs HTTPS vs FTP |
| Stripped URL | Entire URL with the protocol stripped. |
| Host | The host portion of the URL. Received from the IURI interface via "GetHost". |
| Path | The path of the URL. Received from the IURI interface via "GetPath". |
| Query String | The query of the URL. Received from the IURI interface via "GetQuery". |
| Page Title | The title displayed by the web-page. |
| Visit Count | Incremented each time a user visits a site |
| Last Time/Day | The last time/day a user visited a history item |

In one or more embodiments, for history destinations, the host of the URL has the highest importance as it is the most easily recognizable portion of a URL. The page title has lesser importance than the URL.

Favorites Specific Metadata

| Metadata | Description |
| --- | --- |
| Stripped URL | Entire URL with the protocol stripped. |
| Host | The host portion of the URL. Received from the IURI interface via "GetHost". |
| Path | The path of the URL. Received from the IURI interface via "GetPath". |
| Query String | The query of the URL. Received from the IURI interface via "GetQuery". |
| Favorites Name | The user defined named to the favorite. |
| Favorites Title | Title of the page that the Favorites points to |
| Folder Path | Describes the path to a user-named favorites folder. |

For favorite destinations, the name given to the favorite by the user will have the highest importance over the URL. Since the user, in most cases, will supply their own name for each favorite it is generally the most recognizable piece of metadata. The Folder Path is used, for example, when the user has placed a set of favorites in a created folder, e.g. "Dinosaurs". When the user types in "Dinosaur" in the address bar, the favorites in that folder will be included in the results upon which relevancy is calculated, even if the particular favorite does not contain the word "Dinosaur".

RSS Feed Specific Metadata

| Metadata | Description |
| --- | --- |
| Stripped URL | Entire URL with the protocol stripped. |
| Host | The host portion of the URL. Received from the IURI interface via "GetHost". |
| Path | The path of the URL. Received from the IURI interface via "GetPath". |
| Query String | The query of the URL. Received from the IURI interface via "GetQuery". |
| Feed Title | The title given by the publisher to the feed. |
| Feed Name | The name given by the user to the feed. |
| Item Title | The title for a feed item within a feed. |
| Item Content | The content contained within the feed item. |
| Item Author | The author of the feed item. |
| Feed Folder Name | Describes the path to a user-named feed folder that contains RSS feeds. Similar in operation to Folder Path in the Favorites Specific Metadata. |

The feed title and feed name will hold the highest importance for an RSS Feed. Individual feed item titles, contents, and authors will hold a lesser importance than the title and name of the top level feed.

The following tables describe the inputs and matched results when a user types into an address bar when not utilizing prefix matching. For the sake of example, the strings are left in their unbroken form. User query word matches are highlighted. The first table lists example index columns that are used for word breaking and the second table lists example user input and sites with hits.

Example Index of Columns Used When Word Breaking

| Host (protocol included to understand dupes) | Path | Query String | Page Title |
| --- | --- | --- | --- |
| http://www.google.com/ | NULL | NULL | Google |
| http://images.google.com/ | NULL | NULL | Google Images |
| https://images.google.com/ | NULL | NULL | Secure Google Images |
| http://images.com/ | NULL | NULL | Images Home |
| https://securebanking.com/ | NULL | NULL | Secure Banking Website |
| https://google.secure.com/ | NULL | NULL | Google Secure Images |
| http://www1.website.com/ | hello/world.htm | NULL | Website On WWW1 |
| http://website.internet.org/ | path1/path2/search | hi + me | Internet Website |

| Input | Host (protocol included to understand dupes) | Path | Query String | Page Title |
| --- | --- | --- | --- | --- |
| google | http://www.google.com/ | NULL | NULL | Google |
| | http://images.google.com/ | NULL | NULL | Google Images |
| | https://images.google.com/ | NULL | NULL | Secure Google Images |
| | https://google.secure.com/ | NULL | NULL | Google Secure Images |
| images | http://images.google.com/ | NULL | NULL | Google Images |
| | https://images.google.com/ | NULL | NULL | Google Images |
| | http://images.com/ | NULL | NULL | Images Home |
| | https://google.secure.com/ | NULL | NULL | Google Secure Images |

-continued

| Input | Host (protocol included to understand dupes) | Path | Query String | Page Title |
|---|---|---|---|---|
| secure | https://google.secure.com/ | NULL | NULL | Google Secure Images |
|  | https://securebanking.com/ | NULL | NULL | Secure Banking Website |
| website hi me | http://www1.website.com/ | hello/world.htm | NULL | Website On WWW1 |
|  | http://website.internet.org/ | path1/path2/search | hi + me | Internet Website |
|  | https://securebanking.com/ | NULL | NULL | Secure Banking Website |
| hello | http://www1.website.com/ | hello/world.htm | NULL | Website On WWW1 |
| banking | https://securebanking.com/ | NULL | NULL | Secure Banking Website |
| www | http://www.google.com/ | NULL | NULL | Google |
|  | http://www1.website.com/ | NULL | NULL | Website On WWW1 |

Past Browsing Metadata

The following tables outline the past browsing metadata that is specific to each destination. In one or more embodiments, past browsing metadata that is maintained includes Visit Count and Selections.

The visit count is a determinant in the relevancy of sites. The more a user visits a site, the more relevant it will be to a given query. Selections are important as they provide the ability to raise the relevancy of a result as it is selected more and more from a list, such as the address bar. The more a selection is made from the address bar, the more important it may be to a user. Hence, the selection can be promoted within the suggestions.

History results will keep track of the number of times visited along with the number of times an item was selected from the address bar. As for Favorites, in one or more embodiments, the number of selections is tracked. Such is set forth in the following tables.

| History | |
|---|---|
| Metadata | Description |
| Visit Count | Number of times the user has visited this page. |
| Selections | Number of times the user has selected the page from an address bar. |

For destinations, the number of visits to a particular website along with the number of times it has been selected in the address bar will help to determine its relevancy.

| Favorites | |
|---|---|
| Metadata | Description |
| Selections | Number of times the user has selected the page from an address bar. |

For favorites, in one or more embodiments, the number of visits is tied directly to the destination in history with the same URL. Accordingly, in at least some embodiments, the number of visits are not be considered since there will be no cross-group relevancy.

| RSS Feeds | |
|---|---|
| Metadata | Description |
| Visit Count | Number of times the user has visited this page. |
| Selections | Number of times the user has selected the page from an address bar. |

For destinations, the number of visits to a particular RSS Feed along with the number of times it has been selected in the address bar will help to determine its relevancy.

When a user navigates to a website that does not exist in an index that is maintained for tracking a user's history, a new entry is created. The new website is then added to the index with IURI specific URL data. In addition, the Visit Count and Selections are then set to default values.

When a user navigates to a website that does exist in the index, the data provider will generate a query to update the metadata for the destination.

The following table outlines what particular metadata columns will be affected and how.

| Affected Metadata | Effects from User Navigation |
|---|---|
| Visit Count | Increase count by 1. Default value of 0. |
| Selections (if applicable) | Increase count by 1. Default value of 0. |

Weightings

The following tables will outline the weightings that will be applied to a destination's metadata in accordance with one or more embodiments. Individual weighting values represent how important a piece of metadata is in respect to the total relevance of all of the destination's metadata.

For example, suppose the columns Stripped URL (0.50), Visit Count (0.35), and Selections (0.15) were being considered to determine a results relevancy. The total relevance of the metadata is equal to 1.00. Thus the Stripped URL with a 0.50 weighting will result in deciding half (0.50/1.00) of the total relevance of a result.

The values used for the weightings of each metadata column can be assigned in any suitable way. For example, in at least some embodiments, research can be conducted and data can be collected to suggest which pieces of metadata are more important than others. Additionally, the values can be adjusted to adapt to changing feedback and importance.

| History | | | | | | |
|---|---|---|---|---|---|---|
| Stripped URL | Host | Path | Query | Page Title | Visit Count | Selections |
| .50 | .25 | .10 | .10 | .15 | Sort 2nd | Sort 3rd |

In one or more embodiments, the host name of a history destination will hold the most importance since users tend to be trained that destinations are found by typing from the beginning of an URL. Page titles are the second most recognizable string within a history destination, yet deemed slightly less important since a user is not accustomed to typing in a page title and getting results. This will increase the predictability of results as users will understand why the results are showing up.

The visit count for a destination will affect the destination's relevancy heavily since the more a user visits a site, the higher the probability that it will be relevant to a given query.

| Favorites | | | | | |
|---|---|---|---|---|---|
| Stripped URL | Host | Path | Query | Name | Selections |
| .85 | .25 | .10 | .10 | .50 | Sort 2nd |

In one or more embodiments, the name of a favorite destination will hold the most importance since it: is matched in the legacy auto-complete and is generally defined by the user. The URL will hold the same importance as it does in history, but will not be offset by the visit count.

| RSS Feeds and Feed Items | | | | | | | | |
|---|---|---|---|---|---|---|---|---|
| Stripped URL | Host | Path | Query | Feed Title | Feed Name | Item Title | Item Content | Item Author |
| .65 | .10 | .10 | .10 | .25 | .25 | .20 | .10 | .05 |

Since users will search through both RSS feeds and their feed items depending on what they are searching for, both feed metadata and feed item metadata will be considered. The most recognizable strings in the case of feeds and feed items are: feed title, feed name, and the item title.

Relevancy Rule Set

The following discussion describes rules and concepts for determining the relevance of results in accordance with one or more embodiments. In accordance with one or more embodiments, there are two different "mind sets" that a user can use when entering a search query—a confident mindset and a search mindset, each of which is separately described below.

Confident Mindset

If a Confident Mindset is used, then the search provides exact URL matches. When in a Confident Mindset, queries generally have the following characteristics. First, queries are generally one word. Additionally, queries generally start with the following scheme prefixes: http://, http://www., https://, https://www., www., ftp://, file:. Further, queries generally start with a hostname followed by a top-level domain and possibly the remainder of the URL, e.g., google.com, cnn.com/TECH, and rit.edu/infocenter/student.htm.

Search Mindset

If a Search Mindset is used, then word breaking is performed as described above and below. When in a Search Mindset, queries generally have the following characteristics. First, queries are generally two or more words. Additionally, queries generally do not start with a protocol prefix. Further, queries generally start with a hostname but not a top-level domain.

Based off this information, it is possible to return results using one of two methods, which are referred to as the "Confident Method" and the "Search Method". Each method will perform a method of string matching along with choosing a unique set of metadata to calculate relevancy. It is to be appreciated that both methods will sort results by ranking and then by the applicable metadata columns (e.g., visit count and selections) as outlined above.

Figure 7:
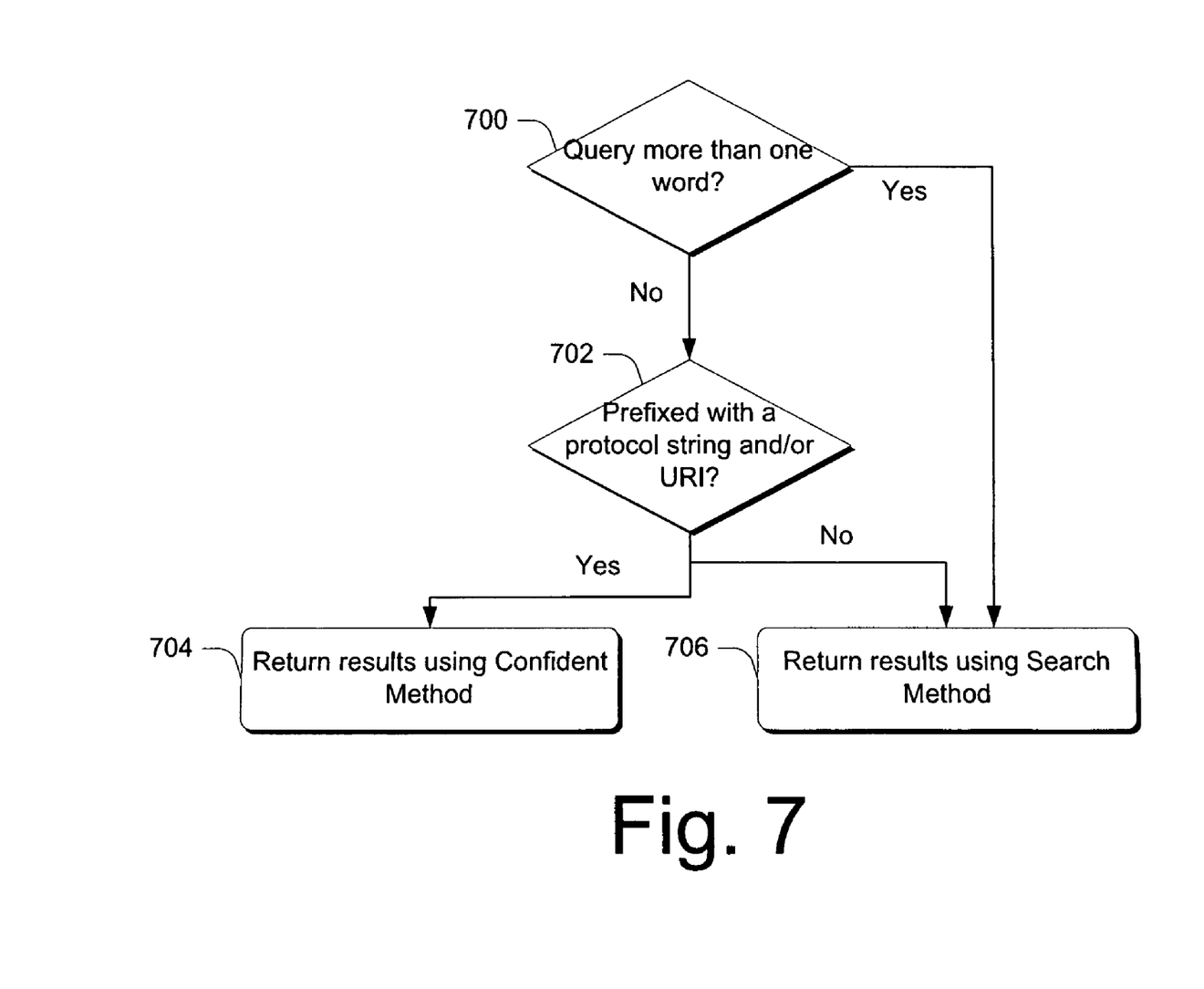
FIG. 7 is a flow diagram that describes steps in a method in accordance with one or more embodiments.

FIG. 7 is a flow diagram that describes steps in a search method in accordance with one or more embodiments. The method can be implemented in connection with any suitable hardware, software, firmware or combination thereof. In at least some embodiments, aspects of the method can be implemented by an application, such as a suitably configured Web browser.

Step 700 ascertains whether a user-entered query is more than one word. If the user-entered query is not more than one word, step 702 ascertains whether the user-entered query is prefixed with a protocol string and/or a URI. If a user-entered query is prefixed with a protocol string and/or a URI, step 704 returns results using a first method which, in this example, is the Confident Method. If the user-entered query is not prefixed with a protocol string and/or a URI, step 706 returns results using a second different method which, in this example, is the Search Method.

If, on the other hand, step 700 ascertains that the user-entered query is more than one word, step 706 returns results using the second different method which, in this example, is the Search Method.

Examples of both the Competent Method and the Search Method are provided just below.

Confident Method

In one or more embodiments, the Confident Method is used when the user is using a one-word query that begins with a protocol prefix or a valid URI. This method utilizes the following approach. First, the query word is stripped of all protocol prefixes in order to perform a prefix string match against a destination's Stripped URL. Second, the following metadata columns are used in order to calculate relevancy:

History

Stripped URL—since there will not be any word breaking, just prefix match the URL Favorites Stripped URL—since there will not be any word breaking, just prefix match the URL RSS Feeds and Feed Items Stripped URL—since there will not be any word breaking, just prefix match the URL Feed Title—it is possible the user's query may match the feed title Feed Name—it is possible the user's query may match the feed name Item Title—it is possible the user's query may match the item title Item Content—it is possible the user's query may match inside the item content Item Author—it is possible the user's query may match the item author Typed URLs
  Stripped URL—since there will not be any word breaking, just prefix match the URL
Search Method
In one or more embodiments, the Search Method is used when the user is using a one-word query that does not begin with a protocol prefix or a valid URI, or is a two- or more-word query. This method utilizes the following approach. First, no changes are made to the query words and word breaking will be used. Second, the following metadata columns are used in order to calculate relevancy:
History
  Host—since word breaking will be used, break on the host
  Path and Query—since word breaking will be used, include the path and query
  Page Title—since word breaking will be used, include the page title
Favorites
  Host—since word breaking will be used, break on the host
  Path and Query—since word breaking will be used, include the path and query
  Favorites Name—since word breaking will be used, include the favorite's name
RSS Feeds and Feed Items
  Host—since word breaking will be used, break on the host
  Path and Query—since word breaking will be used, include the path and query
  Feed Title—since word breaking will be used, include the feed title
  Feed Name—since word breaking will be used, include the feed name
  Item Title—since word breaking will be used, include the item title
  Item Content—since word breaking will be used, include the item content
  Item Author—since word breaking will be used, include the item author
Typed URLs
  Host—since word breaking will be used, break on the host
  Path and Query—since word breaking will be used, include the path and query In one or more embodiments, if the URL of a History destination is just a host and top-level domain, then it should be considered highly relevant. For example, suppose the user types the query "cnn" into the address bar and the following 5 results are returned.
1. www.cnn.com/2007
2. www.cnn.com/2007/TECH
3. www.cnn.com/news/coolstory/1997.html
4. www.cnn.com
5. www.cnn.com/2007/HistoryChannel.htm Since the fourth result is just a host and top-level domain, it should receive a large increase in relevancy. This will provide an increased feeling of predictability for the user as the top-level address is a common starting point for navigating.

In one or more embodiments, destinations may exist in multiple groupings or types. A destination may exist in multiple groupings, but the metadata specific to those groupings may be unique.

In one or more embodiments, cross group relevancy will not be applied. For example, the metadata that exists for a destination in one grouping, History for example, will not have an effect on the relevancy of the same destination that might exist in another grouping.

In one or more embodiments, deleting a destination from the address bar will also delete its relevancy. That is, when an item is deleted by the user from the address bar, it will also be deleted from the appropriate store, and thus will not have the ability to be returned as a relevant result until re-visited.

In one or more embodiments, clearing history will delete History and Typed URLs, thus removing the relevancy for those groups. For example, when a user decides to delete their history, all History and Typed URL destinations and their metadata will be cleared from the index and thus will not have the ability to be returned as a relevant result.

Retrieving the Weightings

In one or more embodiments, data providers build the appropriate query statement, e.g. a SQL statement, used to retrieve and order results from the index.

Returning Relevant Results

In one or more embodiment, once the relevancy rules have been obtained from the relevancy engine, they can be inserted into a query, such as a SQL query, that will be defined and applied by the data provider.

Once applied to the appropriate store, the query allows application of relevancy to the destinations, sorting according to the weightings, and transformation of the resulting data into a format that the data model can digest. The data is then sent back up the layers to the user interface (i.e. address bar drop down menu) where they are then displayed for the user.

Example System

Figure 8:
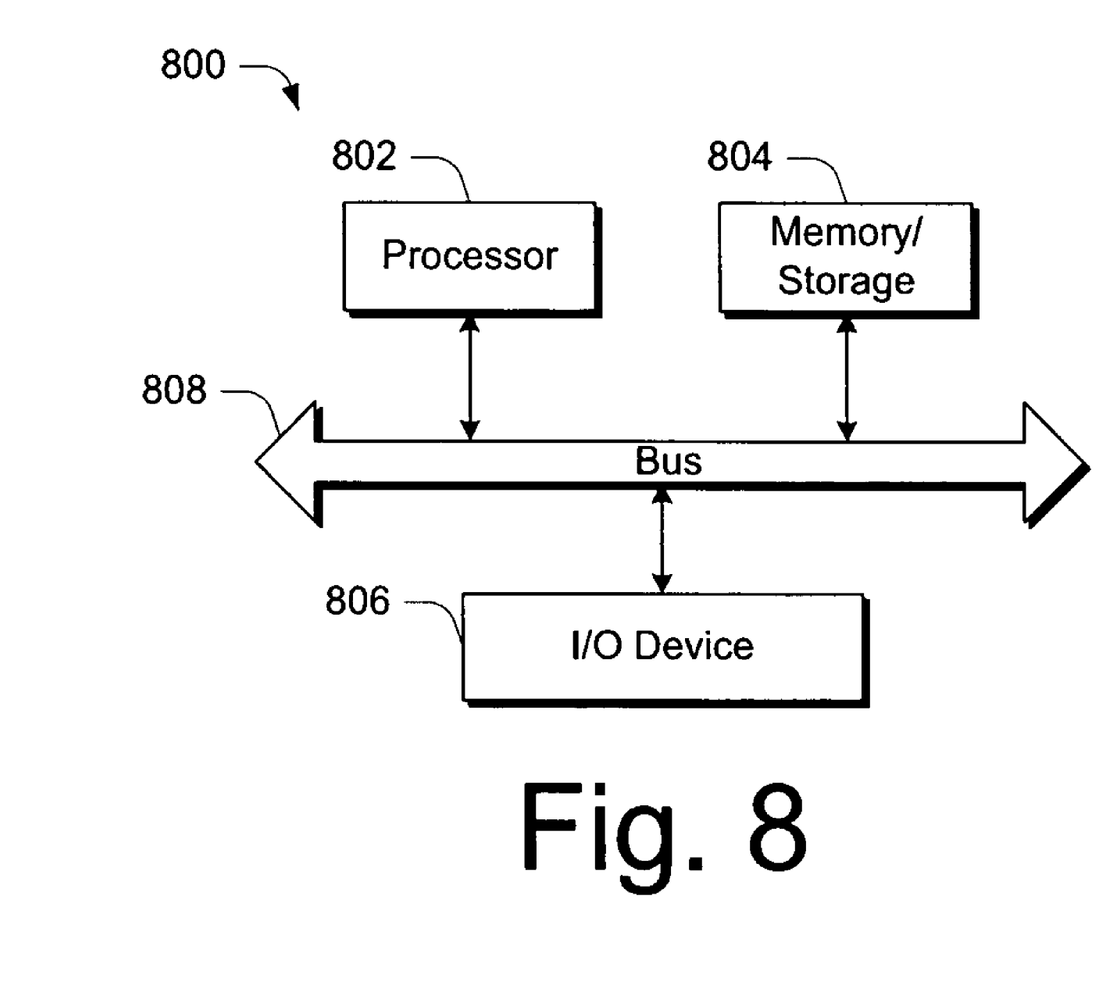
FIG. 8 illustrates an example system that can be used to implement one or more embodiments.

FIG. 8 illustrates an example computing device 800 that can implement the various embodiments described above. Computing device 800 can be, for example, computing device 202 of FIG. 2 or any other suitable computing device.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or non-volatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide a Web browser that employs a relevancy algorithm to make an educated guess as to the likelihood of a user's intended destination when the user begins to enter text into a browser's address bar. In one or more embodiments, the relevancy algorithm employs various parameters and assigns weights to the parameters to arrive at a collection of suggestions to provide to the user. By using various rules, associated weightings, and the relevancy algorithm, relevant suggestions can be provided to a user to facilitate their navigation activities.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   maintaining metadata associated with browser-accessible items, wherein the metadata includes: a title associated with an item, a URL associated with an item, a last date an item was visited by a user, frequency with which an item has been visited by a user, and whether or not an item was selected from a list;
   assigning numerical weights to the metadata to represent how important a particular piece of metadata is in respect to total relevance of maintained metadata;
   processing weighted metadata using a relevancy algorithm;
   receiving a user action associated with accessing one or more items; and
   responsive to receiving the user action, presenting one or more suggestions based upon the user action and an output of the relevancy algorithm, wherein presenting comprises displaying the one or more suggestions grouped according to types of suggestions, wherein individual types of suggestions are associated with a different user action related to the browser that caused an associated suggestion to be presented.

2. The method of claim 1, wherein the user action inputs text into a Web browser user interface.

3. The method of claim 2, wherein the Web browser user interface comprises an address bar into which the text has been typed.

4. The method of claim 1, wherein the user action comprises accessing a drop down menu associated with a Web browser.

5. The method of claim 4, wherein the drop down menu is provided in connection with a browser's address bar.

6. The method of claim 1, wherein the metadata further includes a date an item was last modified.

7. The method of claim 1, wherein the metadata further includes one or more of the following: an unread count associate with an item, whether the user typed an entire string associated with an item, how a user interacted with the page, tags or key words associated with an item, and whether a term provided by the user was used in a full text search.

8. One or more computer-readable storage media comprising computer-readable instructions which, when executed, implement a method comprising:
   maintaining metadata associated with browser-accessible items, wherein the metadata includes one or more of: a title associated with an item, a URL associated with an item, a last date an item was visited by a user, frequency with which an item has been visited by a user, or whether or not an item was selected from a list;
   assigning numerical weights to the metadata to represent how important a particular piece of metadata is in respect to total relevance of maintained metadata;
   processing weighted metadata using a relevancy algorithm;
   receiving a user action associated with accessing one or more items; and
   responsive to receiving the user action, presenting suggestions based upon the user action and an output of the relevancy algorithm, wherein the suggestions are grouped in accordance with different types, wherein at least one of the suggestions utilizes different parameters for the relevancy algorithm than another of the one or more suggestions based, at least in part, on the type of suggestion.

9. The one or more computer-readable media of claim 8, wherein one type includes an URL type.

10. The one or more computer-readable media of claim 8, wherein one type includes a history type.

11. The one or more computer-readable media of claim 8, where in one type includes a favorites type.

12. The one or more computer-readable media of claim 8, wherein one type includes an RSS type.

13. The one or more computer-readable media of claim 8, wherein types comprise an URL type, a history type, a favorites type, and an RSS type.

14. A system comprising:
   one or more computer-readable storage media;
   computer readable instructions embodied on the one or more computer-readable storage media which, when executed, provide a Web browser configured to implement a method comprising:
       maintaining metadata associated with browser-accessible items, wherein the metadata includes: a title associated with an item, a URL associated with an item, a last date an item was visited by a user, frequency with which an item has been visited by a user, and whether or not an item was selected from a list;
       assigning numerical weights to the metadata to represent how important a particular piece of metadata is in respect to total relevance of maintained metadata;
       processing weighted metadata using a relevancy algorithm;
       receiving a user action associated with accessing one or more items; and
       responsive to receiving the user action, presenting one or more suggestions based upon the user action and an output of the relevancy algorithm, wherein presenting comprises displaying the one or more suggestions grouped according to types of suggestions, wherein individual types of suggestions are associated with a different user action related to the browser that caused an associated suggestion to be presented.

15. The system of claim 14, wherein the user action inputs text into a Web browser user interface.

16. The system of claim 15, wherein the Web browser user interface comprises an address bar into which the text has been typed.

17. The system of claim 14, wherein the user action comprises accessing a drop down menu associated with a Web browser.

18. The system of claim 17, wherein the drop down menu is provided in connection with a browser's address bar.

19. The system of claim 14, wherein the metadata further includes a date an item was last modified.

20. The system of claim 14, wherein the metadata further includes one or more of the following: an unread count associate with an item, whether the user typed an entire string associated with an item, how a user interacted with the page, tags or key words associated with an item, and whether a term provided by the user was used in a full text search.

* * * * *